April 30, 1935.　　　W. M. BAILEY　　　1,999,857
SHORT WAVE CAPACITOR
Filed Aug. 8, 1930　　　2 Sheets-Sheet 1
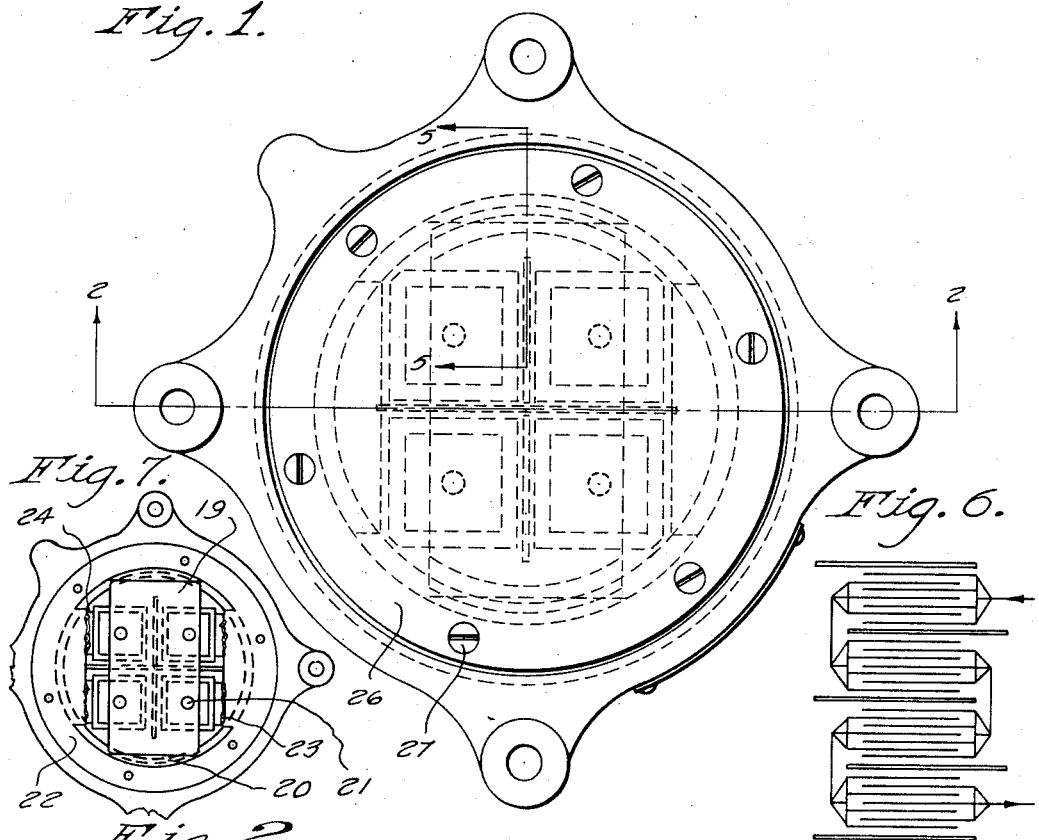
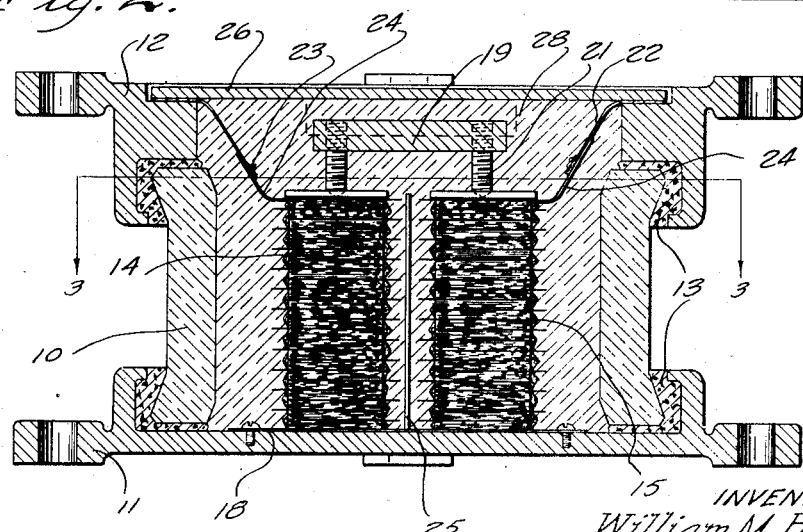
INVENTOR
William M. Bailey
BY
ATTORNEY April 30, 1935.  W. M. BAILEY  1,999,857
SHORT WAVE CAPACITOR
Filed Aug. 8, 1930  2 Sheets-Sheet 2
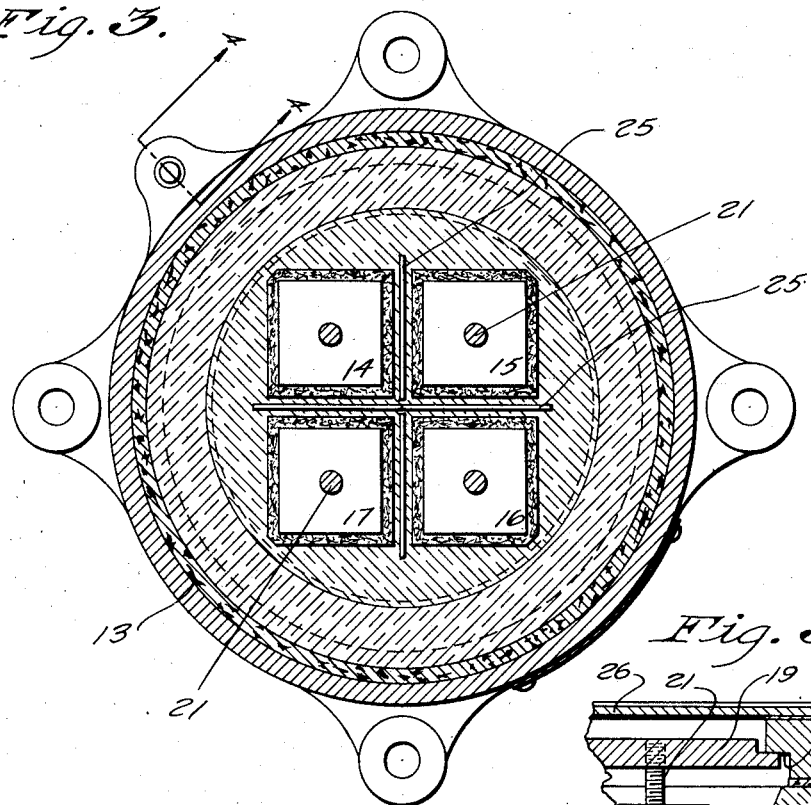
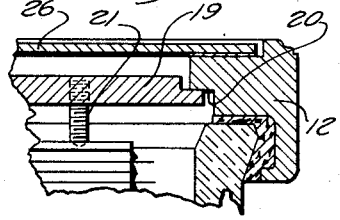
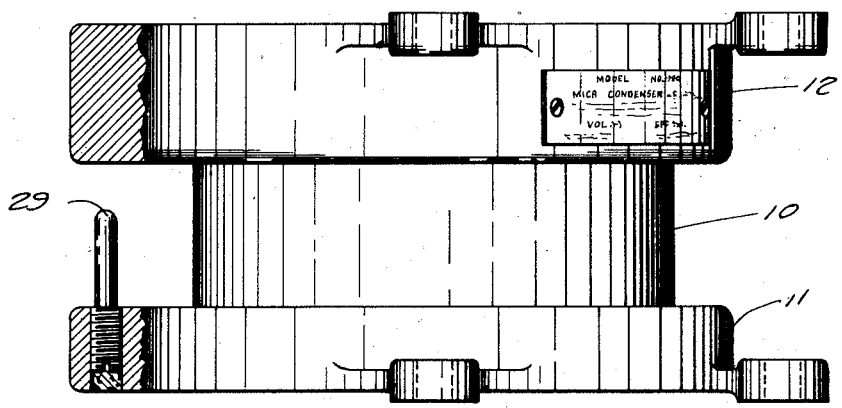
INVENTOR
William M. Bailey
BY Philip Farnsworth
ATTORNEY Patented Apr. 30, 1935

1,999,857

UNITED STATES PATENT OFFICE 1,999,857

SHORT WAVE CAPACITOR

William Mason Bailey, Lynn, Mass., assignor, by mesne assignments, to General Electric Company, a corporation of New York Application August 8, 1930, Serial No. 474,014

23 Claims. (Cl. 175—41)

This invention relates to capacitors and has for its object to provide a capacitor of low high-frequency resistance capable of operating on high frequencies from short waves without excessive heating, and preferably capable of operating at high potentials without break-down.

With short waves a number of difficulties arise which are not encountered in the operation of capacitors on long waves or lower frequencies. One of these problems is the heating due to dielectric and eddy current losses since the very high frequencies cause the occurrence of higher current values. Another difficulty is the tendency of currents at very high frequencies to crowd to the outer edges of a condenser plate or armature. This does not means that the central portion of the armature is not effective as to capacity for it could not be cut out, since this central portion is essential to the provision of the desired capacity value, but with such very high frequencies this central portion of a stack is not usefully efficient in carrying currents, so that the high frequency resistance of the armature or condenser plate depends largely upon the extent of its edges. I have discovered that by increasing the extent of such armature edges to substantially double their former length for a given capacity, the high frequency resistance of the capacitor is roughly halved and the current carrying ability for a prescribed tolerable or minimum temperature rise greatly increased.

With long wave lengths it has been a common expedient in the prior art to use a mica stack within a casing of structural insulating material so arranged that the casing is placed under tension to an amount equal to the stack compression. With such long wave lengths it would have been an unnecessary expense to have several stacks in parallel and of smaller area, because the labor of assembling say four stacks of small active area instead of one stack of large active area would have increased the cost, so that the four stacks construction with smaller active area would have cost about 15% more than a capacitor of the same type having a single stack of cross sectional area equal to the sum of the four stacks of smaller cross sectional area. I have discovered, however, that even the great disadvantage of such extra cost is much more than discounted, for the purpose of short-wave working, by doing just that, i. e., substituting for a single stack of given desired capacity and given total active area of micas and foil armature sheets, a plurality of stacks connected in parallel and given the same desired capacity by having smaller active area of armature and dielectric sheets, the size of the sheets being generally proportional to the number of stacks and the desired capacity. The capacitor illustrated in the drawings by way of example is one designed for use as a direct-current blocking capacitor for a radio transmitter circuit operating at about 15 meters wave-length, on a current of about 25 amperes and voltage of about 20,000. In order to withstand such potential each stack consists of a plurality of sections connected together in series, and such stacks are employed in a plurality and electrically connected in parallel for the purpose and with the result of reducing the above mentioned disadvantages which heretofore have accompanied the use of capacitors in short wave working, such disadvantages including dielectric and eddy current losses (excessive heating) and the current-carrying inefficiency of the central portions of armatures of large area relative to the high current frequency with short waves, and also resulting in heating. Said disadvantage of higher cost is more than discounted, as above, because of the surprising efficiency of the new short-wave capacitor arrangement in reducing the heating by usefully employing as current-carriers the entire areas, if desired, of the armatures of smaller area and by reducing the high frequency resistance inherent in dielectric and eddy current losses. By increasing the number of stacks, for a capacitor of given desired capacity, and decreasing the active area of the stack-sheets, I have increased the lengths of the edges of the sheets in proportion to their area so that the high frequency currents traverse a far greater proportion of the sheet area instead of being concentrated nearer the edges leaving the centers of the armatures relatively idle, the result being that the total amount of current-carrying area, for the same total capacity, is very greatly increased, thereby greatly reducing the high frequency resistance of the capacitor, its losses and consequently its excessive heating by short wave working. In the embodiment illustrated with, for example, four stacks of correspondingly small area of individual sheets, the foil edges have a total length of approximately twice the total length of foil edges in a single stack of equal total cross sectional area, for the same capacity and correspondingly, the high frequency resistance of the four stacks with small armatures is substantially one-half of such resistance in a single large stack of the same total area and capacity. These four stacks may be identical and each may include the same number of sections in series as shown in Fig. 2. The invention includes the various other features shown in the drawings, of which Fig. 1 is the top plan view of one embodiment of this invention.

Fig. 2 is a cross section on line 2—2 of Fig. 1;

Fig. 3 is a cross section taken on line indicated as 3—3 on Fig. 2;

Fig. 4 is an outer side view of the device of Figs. 1 and 3, with a portion shown in section along the line 4—4 of Fig. 3;

Fig. 5 is a section on line 5—5 of Fig 1;

Fig. 6 illustrates the method of connecting the foils in each stack.

Fig. 7 is top plan view like Fig. 1 but with the top cover removed and showing the unitary heat conducting the current carrying strip of Fig. 2.

The casing 10 is preferably of pyrex glass although porcelain or other suitable structural insulating material may be used. The ends 11 and 12 are preferably of cast aluminum secured to the insulating casing 10 by cement 13. The metallic ends cemented to the insulating casing are generally made up in quantities before the stacks are inserted so that the casing units are adapted to contain different classes and values of capacity stacks. In the embodiment illustrated these stacks are numbered 14—17 inclusive and are four in number, although it should be understood that this invention is not necessarily limited to the particular number illustrated. To provide a smooth abutment for the lower ends of the stacks, as well as a good thermal and electrical conductor, a copper plate 18 is screwed or otherwise secured to the lower end member 11, as shown in Fig. 2. The lower set of ends of the four stacks thus are in good thermal connection with the metallic end member 11. To take the high compressive stress under which the stacks are placed, a bridge member 19, see Figs. 2, 5, spans the opening in the casing and is secured in an under-cut portion 20 of the end member 12. After the bridge 19 is secured in position under ledge 20, Fig. 5, the separate adjusting screws 21 are turned to impart the desired pressure on each stack which in this case is the customary pressure of several hundred pounds per square inch of active stack-area. To provide a better heat dissipator and conductor from the top of the stacks, copper strips 24 project from between the top section of each stack and the pressure plates thereon, and are secured by a solder 23 to a combination connector and gasket 22 of the annular or lipped and dished shape illustrated in Fig. 7, the lip or rim of which is held in good thermal contact with the end member 12 by the cover 26 secured to 12 by screws 27. In this manner the thermal path between the end member 12 and the multiple stacks is lower. Between the stacks are placed micanite barriers 25 as shown in Figs. 2, 3 and 7. These barriers perform the function of preventing partial break-down in one stack from spreading to another and also may assist to some extent in making the current values along the inner foil edges more nearly equal to current values along the outer foil edges. But they also keep the stacks from mutual contact, the stacks being permitted to be desirably close together for compactness, by the other features of the invention.

A metal cover 26, preferably of aluminum or sheet iron, is secured by crews 27 to the end member 12, these screws 27 also serving to clamp the heat distributing member 22 in position between the cover 26 and the end member 12. After assembling and before cover 26 is placed in position, the interior of the casing is filled with plastic embedment 28 such as readily fusible paraffin wax or sulphur.

The current in each foil layer is generally considered as travelling toward or from the edge which is electrically connected to the other foils and since each stack is made up of a number of sections in series, Fig. 6, and each section comprises a number of foils connected in parallel as shown in Fig. 6, it will be understood that since there are an even number of such sections the magnetic field of one section opposes the magnetic field of another, with the result that eddy current losses in the various foils are minimized since the generation of magnetic field is minimized. This neutralization of the magnetic field also enables the stacks to be spaced quite closely together thus contributing to a compact arrangement within the insulating casing 10. As is customary, a metallic projection 29, Fig. 4, is secured to one end member and extends toward the other to establish a spark gap between them.

An appreciation of the value of an arrangement like that illustrated may be obtained by comparing a given capacity in single stack as in Proctor Patent 1,660,937 enclosed by an insulating casing, which if used on the short wave lengths contemplated by this invention, would have a heat rise of 60–100 degrees C. sufficient to melt the embedment around the stack. But by lowering the high frequency resistance, operation of a unit having the same capacity, in the manner taught by this invention and when operating under similar conditions, of short wave lengths the unit has a temperature rise of only 10 to 15° C.

The unit capacitor shown is adapted to be used in pluralities connected in series by vertical stacking of one unit upon another, the end terminal 12 being adapted to receive an end terminal 11 of a duplicate unit so that the two or more units will be connected in series, each terminal 11—12 being provided with the bolt-lugs shown for securing the units together in column or stack in good circuit connection. And such columns or stacks themselves may be employed in plural and cross-connected in parallel. Thus each stack within a unit casing consists of a plurality of sections connected in series, the plural stacks in each unit casing are connected in parallel, and the encased units can be stacked together in series connection in vertical columns, and such columns in turn can be connected in miltiple or series-parallel.

I claim:

1. A capacitor comprising a casing, a plurality of spaced stacks within said casing having their axes extending in the same general direction, means for compressing all of said stacks, means to separately adjust the pressure on any stack independent of that on the others within the casing, terminals at the respective ends of said casing between which said stacks are electrically connected in parallel, and good thermal and electrical connecting means bridging across from neighboring ends of all of said stacks at one end into connection with the terminal at that end.

2. A capacitor comprising a casing, a plurality of spaced stacks within said casing having their axes extending in the same general direction, means for compressing all of said stacks, means to separately adjust the pressure on any stack independent of that on the others within the casing, terminals at the respective ends of said casing to which said stacks are electrically connected in parallel, the axes of said stacks being arranged equi-distant from a central axis one set of ends of said stacks being compressed by said compressing means into good thermal relations with their terminal; the other set of ends of said stacks being spaced from their terminal and said compressing means being located in said space; and good thermal and electrical connecting means from neighboring ends of the several stacks and extending through said space into connection with the neighboring terminal.

3. A capacitor comprising a casing, a plurality of spaced stacks within said casing having their axes extending in the same general direction, means for compressing all of said stacks, means to separately adjust the pressure on any stack independent of the others within the casing, terminals at the opposite ends of said casing to which said stacks are electrically connected in parallel, the axes of said stacks being arranged equi-distant from a central axis, and each stack being spaced equi-distant from the adjacent stack on each side of it and a heat-conducting metallic plate secured to one of said terminals and receiving one set of ends of said stacks, said compressing means forcing said stack ends against said plate into good thermal connection between the faces of the stack ends and the plate.

4. A high-potential short wave high current capacitor included in claim 20 comprising a casing of structural insulating material, the stacks being adjacent and parallel to the interior wall of said casing, each electrically connected in parallel, each stack comprising a plurality of series connected sections each including parallel-connected armatures and so arranged that the magnetic fields due to the parallel connected armatures are substantially neutralized within each stack whereby the stacks may be arranged adjacent to each other and connected in parallel, to be capable of carrying a high current without having a magnetic field from one stack induce substantial heating in an adjacent stack.

5. A capacitor comprising a casing, a plurality of spaced stacks within said casing having their axes extending in the same general direction, means for compressing all of said stacks, means to separately adjust the pressure on any stack independent of the others within the casing, terminals at the opposite ends of said casing between which said stacks are electrically connected in parallel, and a heat outlet from adjacent the same end of each stack around the pressure adjusting means and connected to the adjacent terminal.

6. A high-potential short-wave capacitor according to claim 20 and specifically comprising a casing portion of structural insulating material, a plurality of series-sectional stacks in said casing having their axes in general parallelism with one another and with the longitudinal axis of said casing; metallic end terminal casing-members secured to the ends of said insulating casing portion; said stacks being supported by one of said end terminals; means tensioning said insulating casing portion while compressing said stacks against said casing and terminal which supports them, said tensioning and compressing means being located between the other end casing terminal and the neighboring set of stack-ends; and one set of adjacent stack ends being electrically connected to one of said casing end terminals and the other set of adjacent stack-ends being electrically connected to the other casing end terminal.

7. A short wave capacitor comprising a casing portion of structural insulating material, a plurality of series-sectional stacks in general parallelism with one another and with the longitudinal axis of said casing; insulating barriers between the several sections of each stack; metallic casing portions secured to opposite ends of said insulating portion; means compressing the several stacks against one of said metallic casing portions putting said insulating portion of the casing under a tension corresponding to the compression on the several stacks; all said series-sectional stacks being connected in parallel between said metallic end casing portions; and insulating barriers between the stacks.

8. A capacitor according to claim 20 and specifically comprising a casing, a plurality of stacks within said casing lying parallel to one another and to the longitudinal walls of the casing; means for compressing all of said stacks against a transverse metallic wall of the casing putting the longitudinal walls of the casing under tension, the set of ends of said stacks which are supported by and compressed against said metallic transverse casing wall being thermally and electrically connected thereto; a terminal at the other end of the casing and the other set of ends of said plural stacks; and means electrically and thermally connecting said terminal to said neighboring stack-ends.

9. A high-potential short-wave capacitor including a plurality of stacks and a casing therefor having an open-ended generally tubular portion of insulating material extending longitudinally of and around said stacks, and two metallic casing-members secured to the open ends of said insulating portion and therewith enclosing the stacks and constituting the two terminals of the capacitor as a whole; each of said stacks including a plurality of sections connected in series and said stacks extending parallel with one another and with the longitudinal axis of said insulating portion, said insulating casing-portion extending continuously from one of said end terminals to the other to which respectively it is secured; one set of ends of said stacks being supported by one of said end terminals and electrically connected in parallel thereto, and the other set of ends of said stacks being spaced from the second end terminal but electrically connected in parallel thereto whereby all the stacks are connected electrically in parallel between said two end terminals; a stressing member located in the space between said second end terminal and said neighboring set of stack-ends, said stressing member extending transversely across said neighboring stack-ends and constructed and arranged for pushing said insulating casing portion in a direction away from said first end terminal; and a plurality of stack-pressure adjusting means engaging said stressing member on the one hand and on the other each of said neighboring set of stack-ends compressing all the stacks against the first end terminal which supports them and subjecting all the series-sectional stacks to high mechanical compression subjecting said insulating casing portion to a tension stress corresponding with the total compression stresses on all said stacks.

10. A high-potential short-wave capacitor according to claim 20 which includes a plurality of stacks and a casing therefor compressing stack-enclosing elements of metal and insulating material respectively, a metallic element of said casing constituting a terminal of the capacitor as a whole and supporting one set of ends of said stacks and electrically connected to said ends in parallel; each stack including a plurality of sections electrically connected in series and all the stacks extending parallel to one another; and means putting an element of said casing under tension while compressing all said stacks against said metallic casing element which supports them and is electrically connected to them; all said stacks being electrically connected in parallel between the two terminals of the capacitor.

11. A high-potential short-wave capacitor according to claim 20 which includes a plurality of stacks extending parallel with one another and each consisting of a plurality of sections electrically connected in series with one another; and clamping means including a terminal of the capacitor on which one set of ends of said stacks are supported, said clamping means as a whole engaging opposite sets of ends of the stack and subjecting them to high mechanical compression; said parallel-extending stacks being electrically connected in parallel between the two terminals of the capacitor.

12. A high-potential short-wave capacitor according to claim 20 which includes a casing of insulating material having metallic end terminal members of which one in a duplicate unit is complemental to the other for assembly therewith constituting an assembly of duplicate units electrically connected end to end in series; and a plurality of stacks enclosed in said casing, extending parallel to one another and to the insulating casing and toward the end terminal members thereof; each of said stacks including a plurality of sections connected in series; and one set of ends of said stacks being connected to one end terminal member of said casing and the other set of ends of said stacks being connected to the other end terminal of said casing.

13. A high-potential short-wave capacitor according to claim 20 which includes stacked-together armatures and dielectrics arranged, as contrasted with a single stack of the same capacity and total entire cross sectional or armature area, in a plurality of parallel-connected stacks of armatures and dielectrics individually possessing smaller active cooperating areas, causing an increase of the total length of armature edges in the capacitor and a corresponding reduction of high frequency resistance and heating by short wave working; each of said plural parallel-connected stacks including a plurality of sections electrically connected in series.

14. A high potential short-wave capacitor which includes stacked-together armature and dielectric sheets; a casing therefor having an open-ended generally tubular portion of insulating material and two metallic casing-members secured to the open ends of said insulating portion and constituting the two terminals of the capacitor as a whole; said stacked-together sheets being arranged, as contrasted with a single stack of the same capacity and total active cross sectional area, in a plurality of parallel-connected stacks individually possessing smaller active cooperating areas but causing an increase of the total length of armature edges in the capacitor as a whole and a corresponding reduction of high frequency resistance and heating by short wave working; each of said parallel connected stacks including a plurality of sections electrically connected in series, and all the stacks being located parallel to one another and to the longitudinal axis of said insulating casing portion, the parallel connection of said stacks being obtained by connection of one set of their adjacent ends to one of said casing end terminals and the connection of the other set of their adjacent ends to the second casing end terminal; one set of said adjacent ends being spaced from said second end terminal, and a stressing member located in said space and extending across the neighboring set of stack-ends and transversely across said insulating casing portion and constructed and arranged for pushing said casing portion in a direction away from said first casing end terminal; and a plurality of stack-pressure adjusting means engaging said stressing member on the one hand and on the other each of said neighboring set of stack-ends compressing all the stacks against said first casing end terminal which supports the stacks and subjecting all the series-sectional stacks to high mechanical compression subjecting said insulating casing portion to a tension stress corresponding with the total compression stresses on said several stacks.

15. A high-potential short-wave capacitor according to claim 20 which includes stacked-together armature and dielectric sheets; a casing therefor comprising stack-enclosing elements of metal and insulating material respectively, a metallic element of said casing constituting a terminal of the capacitor as a whole and supporting said stacked-together sheets; said sheets being arranged, as contrasted with a single stack of the same capacity and total active cross-sectional area, in a plurality of parallel-connected stacks individually possessing smaller active cooperating areas but causing an increase of the total length of armature edges in the capacitor as a whole and a corresponding reduction of high frequency resistance and heating by short wave working; each of said stacks including a plurality of sections electrically connected in series with one another and one set of ends of said stacks being supported by and electrically connected to said metal casing portion terminal, and the other set of ends of said stacks being electrically connected to the other terminal of the capacitor; and means putting an element of said enclosing casing under tension while compressing all said stacks against said metallic casing element which supports them and is electrically connected to them.

16. A high-potential capacitor which includes a plurality of series-sectional stacks extending longitudinally alongside one another, an insulating stack-enclosing casing provided with two end terminal members secured thereto in the neighborhood of the opposite sets of ends of said stacks, one of said end terminal members being formed with a central opening for assembly passage of the stacks; a cover for said opening and secured to said end terminal member itself; a metallic gasket extending around between said cover and end terminal member and clamped by the former in good thermal contact with the latter, said gasket having internal portions projecting between said cover and the neighboring set of ends of said stacks and toward the latter; clamping plates on the exposed ends of the neighboring end sections of the several stacks; and metallic strips clamped by said plates in good thermal contact with the end faces of said end sections and extending to said internal projecting portions of said gasket and thermally connected thereto.

17. A high-potential capacitor according to claim 20 which includes a plurality of series sectional stacks extending longitudinally alongside one another, an insulating stack-enclosing casing provided with two end terminal members secured thereto in the neighborhood of the opposite sets of ends of said stacks; one of said sets of stack-ends facing one of said end terminal casing members and supported thereby in good thermal relation with the surfaces of said stack-ends, and the other set of stack-ends being spaced from the second end terminal casing member; pressure-plates on the opposite set of stack-ends; means in said space compressing the stacks between said plates and said first end terminal casing member which supports the stacks; metallic strips engaging beneath said pressure plates and clamped thereby into good thermal relation with the corresponding ends of the stacks; and a single heat-conducting member common to all the stacks and clamped to the second end terminal casing member and thermally connected to said several strips beneath said pressure plates.

18. A high-potential capacitor according to claim 20 which includes a plurality of series sectional stacks extending longitudinally alongside one another, an insulating stack-enclosing casing provided with two end terminal members secured thereto in the neighborhood of the opposite sets of ends of said stacks; a heat-conducting plate inside the casing and secured to one of said end terminal casing members and supporting one set of ends of the stack in good thermal relation with said end terminal member; means inside the casing at the other set of ends of the stacks and compressing them against said heat-conducting plate into good thermal relation therewith; and a second heat-conducting plate inside the casing at the end thereof opposite the first and held in good thermal relation with the second end terminal casing member; said second heat-conducting plate being maintained in good thermal relation with the neighboring set of stack-ends by means of the same said compressing means which compresses the stacks and forces them into good thermal relations with said first heat-conducting plate.

19. A high-potential capacitor according to claim 20 which includes a plurality of series sectional stacks extending longitudinally alongside one another in a group, an insulating stack-enclosing casing provided with two end terminal members secured thereto in the neighborhood of the opposite sets of ends of said stacks; insulating barrier plates extending between the several grouped stacks; one of said end terminal casing members supporting one set of ends of the grouped stacks, but the other set of stack-ends being spaced from the second end terminal casing member; a heat-conducting plate interposed between the first end terminal casing member and the adjacent set of stack-ends; a second heat-conducting plate in good thermal relation with the second end terminal casing member; pressure-plates on the stack-ends which are spaced from the second end terminal casing member; metallic heat-conducting strips interposed between said pressure-plates and the faces of the corresponding stack-ends and extending out into said space and there thermally connected with said second heat-conducting plate; and stack-compressing means also located in said space and putting said insulating casing under tension while compressing the several stacks of the group toward said first end terminal casing member and clamping the opposite sets of stack ends respectively against said first heat conducting plates and said heat conducting strips.

20. A capacitor having low resistance to high-frequency currents which includes armatures proportioned to the desired capacity but large in number and small in area of individual armatures, such large number and small individual area being such, in addition to the usual proportioning to obtain the desired capacity, as substantially to reduce the central armature portions relatively idle in conducting high-frequency currents of short-wave working, and correspondingly to increase the total length of armature edges in the armature system and therefore the total amount of armature area most usefully conducting the high frequency currents for the same desired capacity and applied frequency, thereby substantially increasing the conductance of the armature system at the same desired capacity for the given high frequency applied across its terminals, and thereby reducing the losses in and excessive heating of the armature system by such short-wave working.

21. A capacitor according to claim 20 wherein as a practical mechanical matter as to the maintenance of the armatures of relatively small area in their proper electrostatic relations such armatures are arranged in a plurality of relatively short stacks connected in parallel, the area of the several armatures being proportioned to the desired total capacity of the capacitor including said parallel connected stacks in addition to the total number of armatures; said parallel relation of the plural stacks also further reducing heating in addition to the construction of claim 20 by reducing eddy-current losses in the armatures.

22. A capacitor according to claim 20 wherein heating is reduced further by a stack arrangement consisting of the disposition of the relatively small armatures in an even number of serially connected stack-sections or groups whereby heating by eddy-currents in the armatures is reduced, said serially-connected stack-sections also enabling the capacitor of low high-frequency resistance to withstand high potentials of the high frequency current applied to the capacitor terminals.

23. A capacitor according to claim 20 and wherein as a practical matter as to the maintenance of the armatures of relatively small area in their proper electrostatic relations such armatures are arranged in a plurality of relatively short stacks connected in parallel, the area of the several armatures being proportioned to the desired total capacity of the capacitor including said parallel connected stacks in addition to the total number of armatures, said parallel relation of the plural stacks also further reducing heating in addition to the construction of claim 20 by reducing eddy-current losses in the armatures; and wherein the plural stacks are arranged quite closely together for convenient compactness without interfering magnetic fields, each stack for that purpose consisting of an even number of serially-connected sections or groups of the relatively small armatures connected in parallel, whereby heating by eddy-current losses in the armatures is reduced and the magnetic fields of the sections oppose and tend to neutralize one another; said serial connections of the stack-sections serving also to enable the relatively short parallel-connected stacks of the low high-frequency resistance capacitor to withstand high potentials of the high frequency current applied to its terminals.

WILLIAM M. BAILEY.